(12) United States Patent
Yabuta et al.

(10) Patent No.: US 12,734,714 B2
(45) Date of Patent: Sep. 15, 2026

(54) SUCKING APPARATUS

(71) Applicant: Panasonic Intellectual Property Management Co., Ltd., Osaka (JP)

(72) Inventors: Takuma Yabuta, Kanagawa (JP); Kazunori Kouno, Osaka (JP); Yoshinari Matsuyama, Osaka (JP); Tomohiro Nakatani, Osaka (JP); Tomoyo Arita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 545 days.

(21) Appl. No.: 18/373,410

(22) Filed: Sep. 27, 2023

(65) Prior Publication Data

US 2024/0017425 A1 Jan. 18, 2024

Related U.S. Application Data

(63) Continuation of application No. PCT/JP2022/010324, filed on Mar. 9, 2022.

(30) Foreign Application Priority Data

Mar. 31, 2021 (JP) ................................ 2021-061456

(51) Int. Cl.
*B25J 15/06* (2006.01)

(52) U.S. Cl.
CPC ................................ *B25J 15/0616* (2013.01)

(58) Field of Classification Search
CPC .......................... B25J 15/0625; B25J 15/0616
See application file for complete search history.

(56) References Cited

FOREIGN PATENT DOCUMENTS

EP 4190516 A1 * 6/2023 .......... B25J 15/0691
JP 2015-53421 3/2015

OTHER PUBLICATIONS

International Search Report issued May 31, 2022 in International (PCT) Application No. PCT/JP2022/010324.

* cited by examiner

*Primary Examiner* — Daniel Jeremy Leeds
(74) *Attorney, Agent, or Firm* — Wenderoth, Lind & Ponack, L.L.P.

(57) ABSTRACT

A sucking apparatus for a sheet having adhesiveness includes a first member including a first surface that sucks the sheet, and a second member including a second surface that surrounds an outer periphery of the first surface and is in contact with the sheet. The first surface includes a plurality of holes opened, and the first surface is subjected to surface treatment to allow the sheet to be less likely to stick to the first surface than to the second surface.

9 Claims, 10 Drawing Sheets

1
60
S
50

1
11
10
30
23
10B
20B
S
70
21
22
20
10A
20A
T

SUCKING APPARATUS

BACKGROUND

1. Technical Field

The present disclosure relates to a sucking apparatus.

2. Description of the Related Art

Patent Literature (PTL) 1 describes a substrate sucking mechanism for sucking a substrate. The substrate sucking mechanism includes a frame body, a plate attached to a lower surface of the frame body and having a large number of suction holes opened, and a sheet material having air permeability stuck to a bottom surface of the plate. The sheet material has an upper surface formed as an adhesive surface, and is detachably stuck to the bottom surface of the plate with the adhesive surface. The suction holes of the plate communicate with a vacuum pump through an air chamber formed inside the frame body.

PTL 1 is Unexamined Japanese Patent Publication No. 2015-053421.

SUMMARY

It is an object of the present disclosure to provide a sucking apparatus for a sheet having adhesiveness.

A sucking apparatus according to an aspect of the present disclosure is for a sheet having adhesiveness, the sucking apparatus including: a first member including a first surface that sucks the sheet; and a second member including a second surface that surrounds an outer periphery of the first surface and is in contact with the sheet. The first surface includes a plurality of holes opened, and the first surface is subjected to surface treatment to allow the sheet to be less likely to stick to the first surface than to the second surface.

The present disclosure enables providing a sucking apparatus for a sheet having adhesiveness.

DETAILED DESCRIPTION

Hereinafter, exemplary embodiments of the present disclosure will be described in detail with reference to the drawings as appropriate. Unnecessary detailed description may not be described. For example, a detailed description of well-known matters and a duplicate description of substantially identical configurations may not be described. This is to avoid an unnecessarily redundant description below and to facilitate understanding of those skilled in the art. Note that the attached drawings and the following description are provided for those skilled in the art to fully understand the present disclosure, and are not intended to limit the subject matter as described in the appended claims.

The present disclosure may describe a downward direction as a direction along the gravity direction, and an upward direction as a direction opposite to the gravity direction. The present disclosure also may describe a longitudinal section as a section parallel to the gravity direction, and a lateral section as a section perpendicular to the gravity direction.

Figure 1:
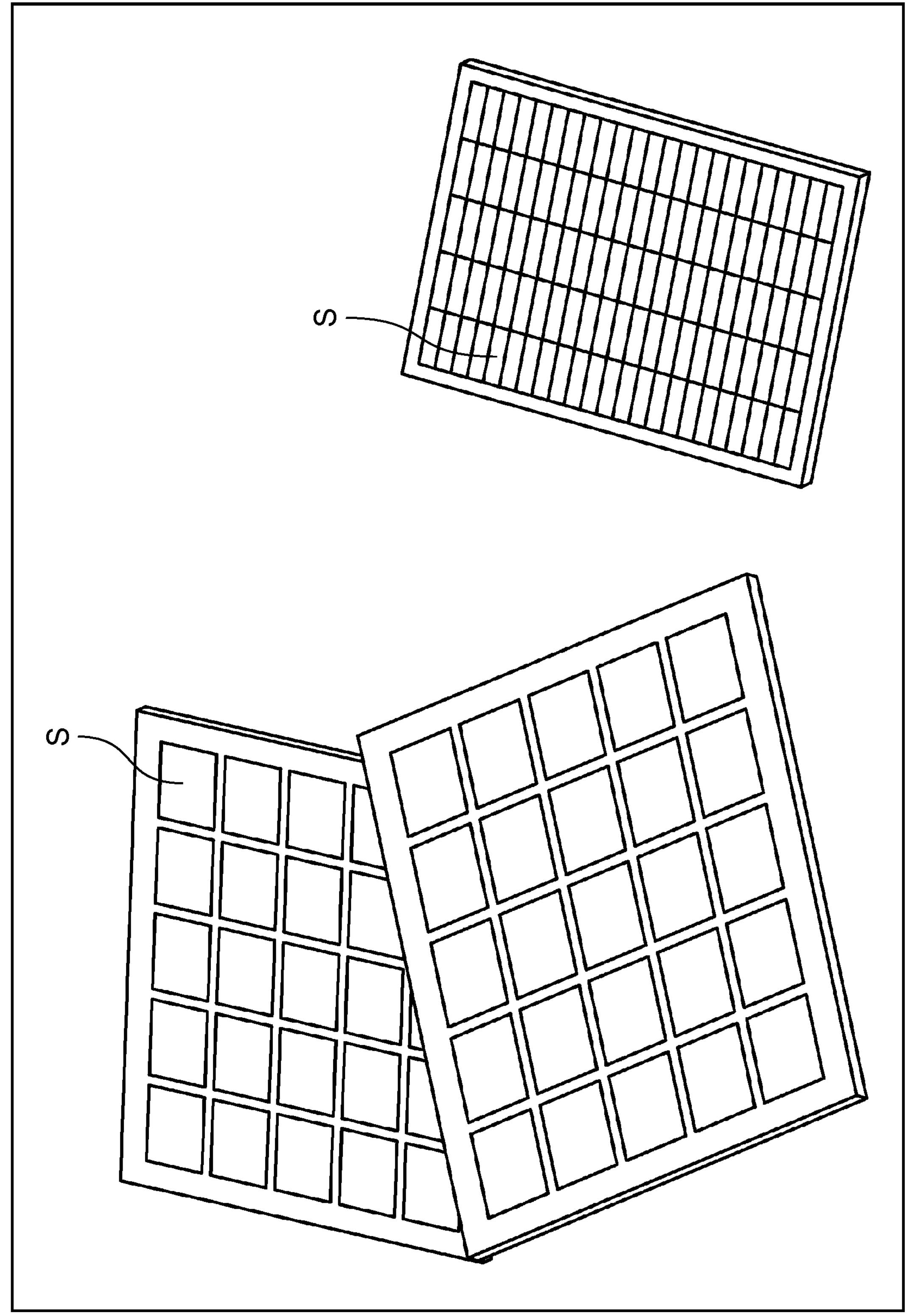
FIG. 1 is a conceptual diagram illustrating a sheet having adhesiveness.

FIG. 1 is a conceptual diagram illustrating a sheet having adhesiveness.

The exemplary embodiment of the present disclosure shows thermally conductive sheet S as an example of a sheet having adhesiveness to be sucked. However, the sheet having adhesiveness to be sucked by the sucking apparatus according to an exemplary embodiment of the present disclosure is not limited to thermally conductive sheet S. Other examples of the sheet having adhesiveness include a heat dissipation sheet and cookie dough. When the sheet having adhesiveness is firmly stuck to a suction surface of the sucking apparatus, an excessive force is required to peel the sheet, whereby the sheet may be deformed or broken. In contrast, when the sheet having adhesiveness is prevented from sticking to the suction surface, the sheet may not be sucked because air escapes from a gap between the suction surface and the sheet. Thus, an exemplary embodiment of the present disclosure provides an exterior part to enable the sheet to be sucked while the sheet is prevented from sticking to the suction surface. The exemplary embodiment of the present disclosure shows thermally conductive sheet S that is described as an example of a sheet having adhesiveness to be sucked.

Thermally conductive sheet S is stuck to a heating element such as an integrated circuit (IC) in an electronic device such as a mobile phone or a personal computer. Thermally conductive sheet S is used as a heat dissipation sheet. Thermally conductive sheet S releases heat taken from the heating element to a metal housing or the like. Thermally conductive sheet S is formed using a material having a high thermal conductivity, such as silicone.

Thermally conductive sheet S has adhesiveness and flexibility to some extent. Thermally conductive sheet S is easily stuck to a heating element such as an electronic component. Unfortunately, thermally conductive sheet S may also have properties of being brittle and easily tom. Thermally conductive sheet S has adhesiveness, and thus is less likely to be sucked by a sucker, for example. When thermally conductive sheet S is blown toward a heating element such as an electronic component by air, thermally conductive sheet S may stick to an unintended place. Additionally, when thermally conductive sheet S stuck once is forcibly peeled off, thermally conductive sheet S is tom. As a result, thermally conductive sheet S is less likely to be automatically stuck to the heating element using a robot hand (end effector) or the like.

Thus, each of exemplary embodiments below shows an example described as a sucking apparatus capable of sucking a sheet having adhesiveness such as thermally conductive sheet S described above and releasing the sucking at a predetermined position to allow the sheet to be correctly stuck.

Figure 2:
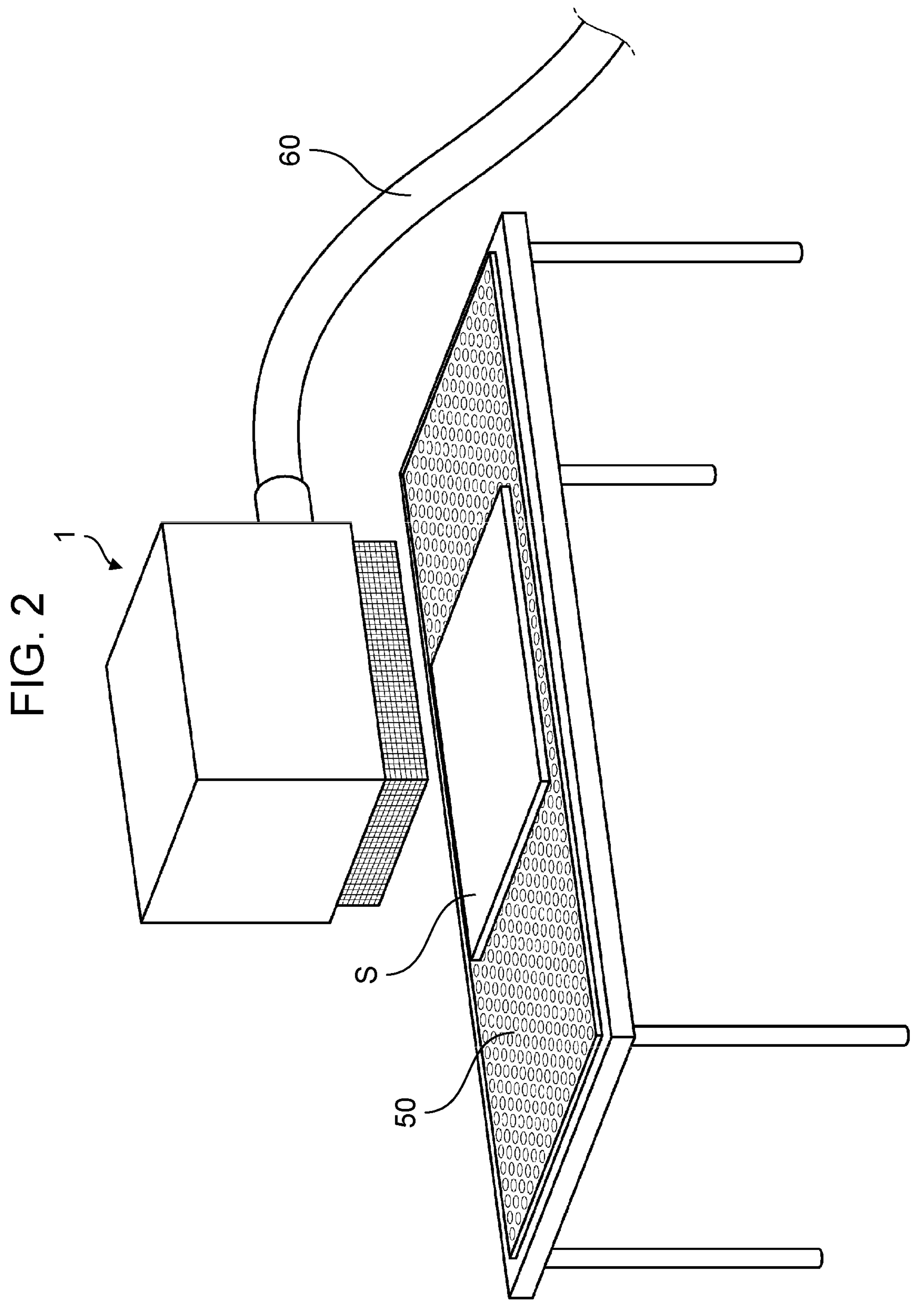
FIG. 2 is a conceptual diagram illustrating a usage example of a sucking apparatus according to an exemplary embodiment of the present disclosure.

FIG. 2 is a conceptual diagram illustrating a usage example of sucking apparatus 1 according to an exemplary embodiment of the present disclosure. Thermally conductive sheet S, which is an example of a sheet having adhesiveness, is disposed on a table, a component container, or the like disposed in a factory or the like. Thermally conductive sheet S has adhesiveness, and thus may be disposed on mounting plate 50 or the like provided on a table to enable thermally conductive sheet S to be easily sucked by sucking apparatus 1. Mounting plate 50 may be formed with a punched plate with a plurality of holes opened.

Sucking apparatus 1 is supported by an end effector (not illustrated). After sucking apparatus 1 sucks thermally conductive sheet S, the end effector moves to move thermally conductive S to a predetermined position, for example, above a heating element such as an IC chip.

Sucking apparatus 1 is connected to air tube 60. Air tube 60 is connected to a pump (not illustrated). When the pump is operated, air in sucking apparatus 1 is sucked through air tube 60. Sucking apparatus 1 sucks thermally conductive sheet S using this suction force.

Figure 3:
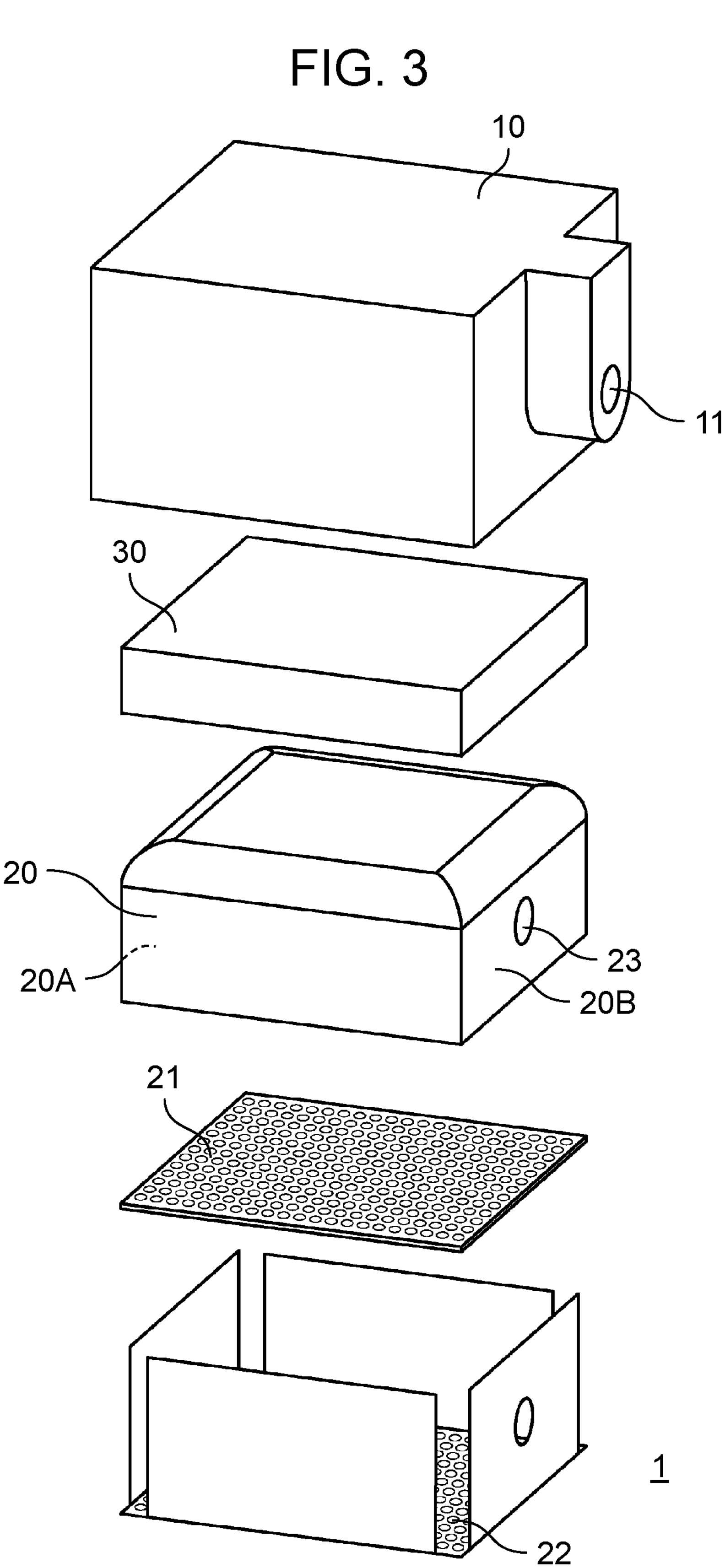
FIG. 3 is an exploded perspective view of a sucking apparatus according to an exemplary embodiment of the present disclosure.
Figure 4:
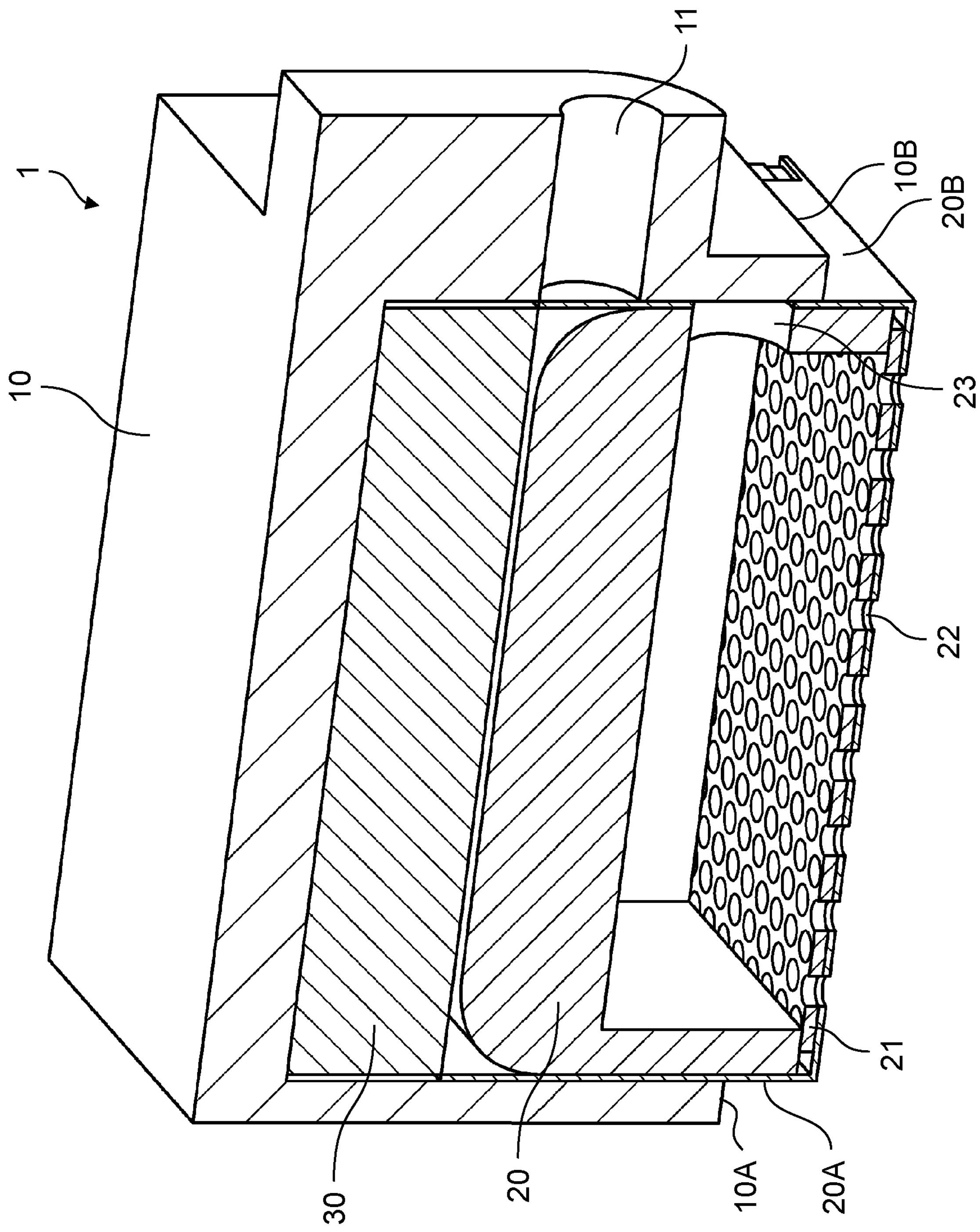
FIG. 4 is a perspective view illustrating a section of a sucking apparatus according to an exemplary embodiment of the present disclosure.

FIG. 3 is an exploded perspective view of sucking apparatus 1 according to an exemplary embodiment of the present disclosure. FIG. 4 is a perspective view illustrating a section of sucking apparatus 1 according to an exemplary embodiment of the present disclosure. With reference to FIGS. 3 and 4, structure of sucking apparatus 1 according to an exemplary embodiment of the present disclosure will be described.

Sucking apparatus 1 according to an exemplary embodiment of the present disclosure includes exterior part 10 and interior chamber part 20. Exterior part 10 generally presents a box shape. Exterior part 10 surrounds interior chamber part 20. Interior chamber part 20 is inserted into exterior part 10 in a movable manner in a first direction. The first direction in FIGS. 3 and 4 is a downward direction (gravity direction) in FIGS. 3 and 4. This definition corresponds to a case where thermally conductive sheet S is disposed below and sucking apparatus 1 sucks thermally conductive sheet S from above. However, sucking apparatus 1 may be used in another direction such as a lateral direction, so that the first direction is not limited to the gravity direction. Interior chamber part 20 corresponds to the first member provided in sucking apparatus 1, and exterior part 10 corresponds to the second member provided in sucking apparatus 1, in an exemplary embodiment of the present disclosure.

Interior chamber part 20 generally presents a box shape. Interior chamber part 20 serving as the first member in an exemplary embodiment of the present disclosure includes a plurality of holes formed in the first direction. The plurality of holes may be implemented by allowing interior chamber part 20 to be provided on its side in the first direction with punched plate 21 described later, for example. Sucking apparatus 1 may be configured to prevent the plurality of holes from being disposed in a direction coinciding with the first direction when exterior part 10 is formed in a parallelogram shape in which the first direction is an oblique direction, for example.

Figure 5:
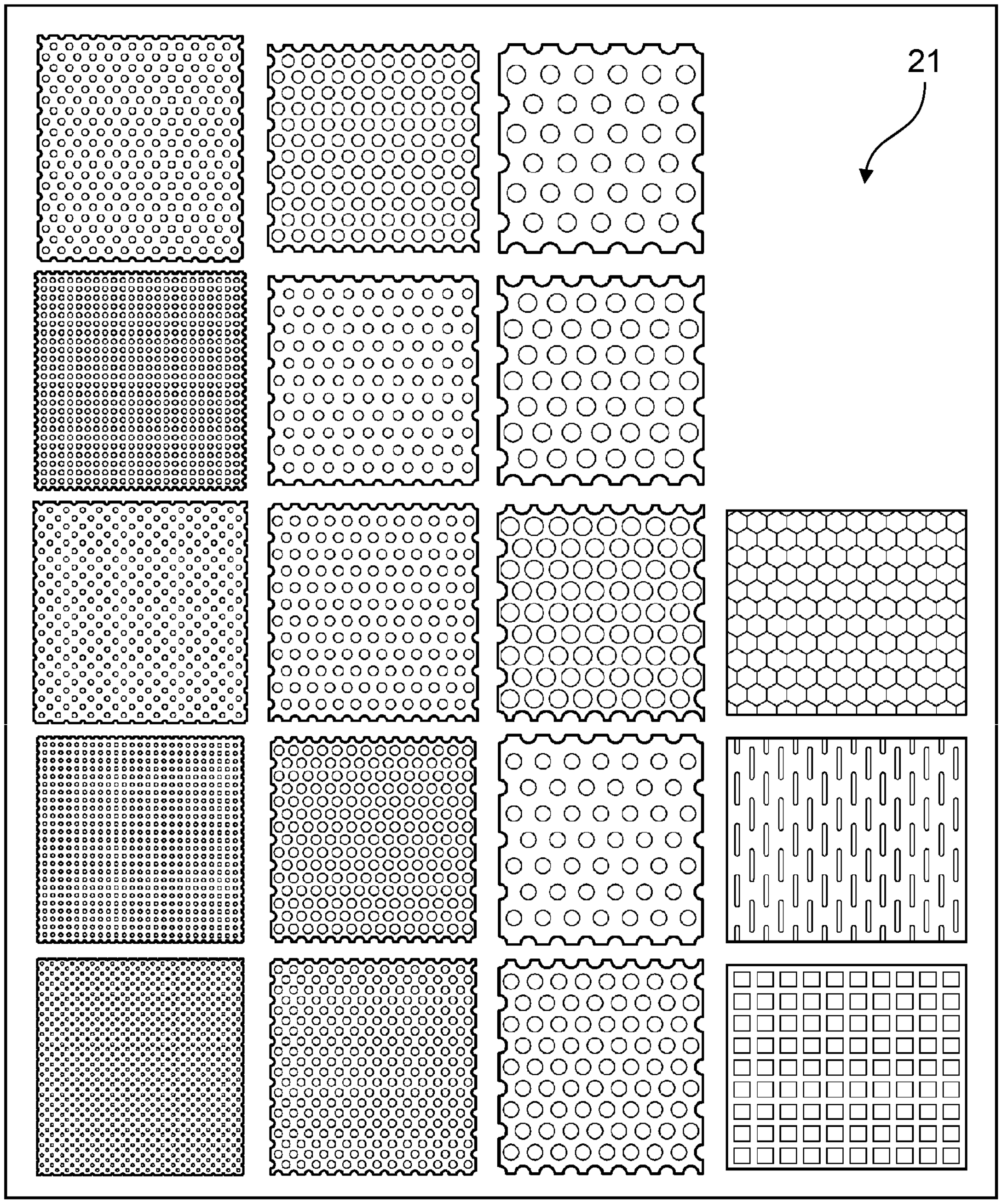
FIG. 5 is a conceptual diagram illustrating a punched plate provided in an interior chamber part.

Here, punched plate 21 will be described. FIG. 5 is a conceptual diagram illustrating a plurality of aspects of punched plate 21 provided in interior chamber part 20. Punched plate 21 includes a plurality of holes through which air moves. Punched plate 21 may be made of metal, for example. The holes have shapes, sizes, intervals therebetween, a placement mode, an aperture ratio, and the like, which are not particularly limited. Examples of the sizes of the holes include a diameter of 1 mm to 1.5 mm of a circular hole. A person skilled in the art may appropriately determine an aspect of the holes from viewpoints such as a degree of vacuum of interior chamber part 20 when suction is performed by the pump, and suction that can be performed evenly throughout a surface of punched plate 21. Punched plate 21 may include a plurality of holes opened in a staggered placement. This is because the staggered placement enables not only more air to be moved through punched plate 21, but also strength of punched plate 21 to be maintained.

Punched plate 21 described above is provided on a surface that corresponds to the first surface of the first member exemplified by interior chamber part 20 in an exemplary embodiment of the present disclosure. The first surface sucks a sheet having adhesiveness (thermally conductive sheet S in the present exemplary embodiment).

With reference to FIGS. 3 and 4 again, structure of sucking apparatus 1 according to an exemplary embodiment of the present disclosure will be described. Exterior part 10 corresponds to the second member provided in sucking apparatus 1 in an exemplary embodiment of the present disclosure. The second member has the second surface that surrounds the outer periphery of the first surface and is in contact with the sheet having adhesiveness (thermally conductive sheet S in the present exemplary embodiment).

Interior chamber part 20 has the surface provided with the holes opened, or the first surface. The first surface is subjected to surface treatment so that a sheet (thermally conductive sheet S in the present exemplary embodiment) having adhesiveness is less likely to stick to the first surface than to the second surface. This surface treatment may be performed by sticking release film 22 to the outside of punched plate 21, for example. Release film 22 may be stuck to a region including the surface provided with the holes opened of interior chamber part 20 with a double-sided tape or the like, for example, or may be fixed to the region using other fixing means. Release film 22 is slippery. Thus, unless another external force acts, thermally conductive sheet S in contact with release film 22 is not bonded to release film 22, and can be easily peeled off. Release film 22 is also provided with holes opened as with punched plate 21.

The surface treatment on the first surface may be performed by means other than release film 22. For example, asperities may be formed on the first surface, or chemical surface treatment may be performed on the first surface. The asperities may be formed by cutting a groove or providing many mountains. Examples of release film 22 used in an exemplary embodiment of the present disclosure include a release film having a pitch between asperities (interval between asperities) of 0.5 mm and a protrusion with a height of 0.15 mm. However, the release film used for the surface treatment is not limited to that having the dimensions described above.

Between an inner wall of exterior part 10 and an outer wall of interior chamber part 20, elastic member 30 is disposed. Elastic member 30 is a cushion, for example. Elastic member 30 may be a spring. The inner wall of exterior part 10 and the outer wall of interior chamber part

20 may be fixed to elastic member 30. When elastic member 30 is a cushion, these members may be fixed to each other with a double-sided tape. When elastic member 30 is a spring, a stopper for fixing the spring may be additionally provided. Elastic member 30 has elasticity that allows interior chamber part 20 to be movable in the first direction with respect to exterior part 10. FIG. 4 illustrates a state after interior chamber part 20 moves in the first direction with respect to exterior part 10, in which side surfaces 20A, 20B of interior chamber part 20 partly protrude from exterior part 10. Exterior part 10 includes edges 10A, 10B that correspond to the second surface of the second member and that will be described later.

Figure 6:
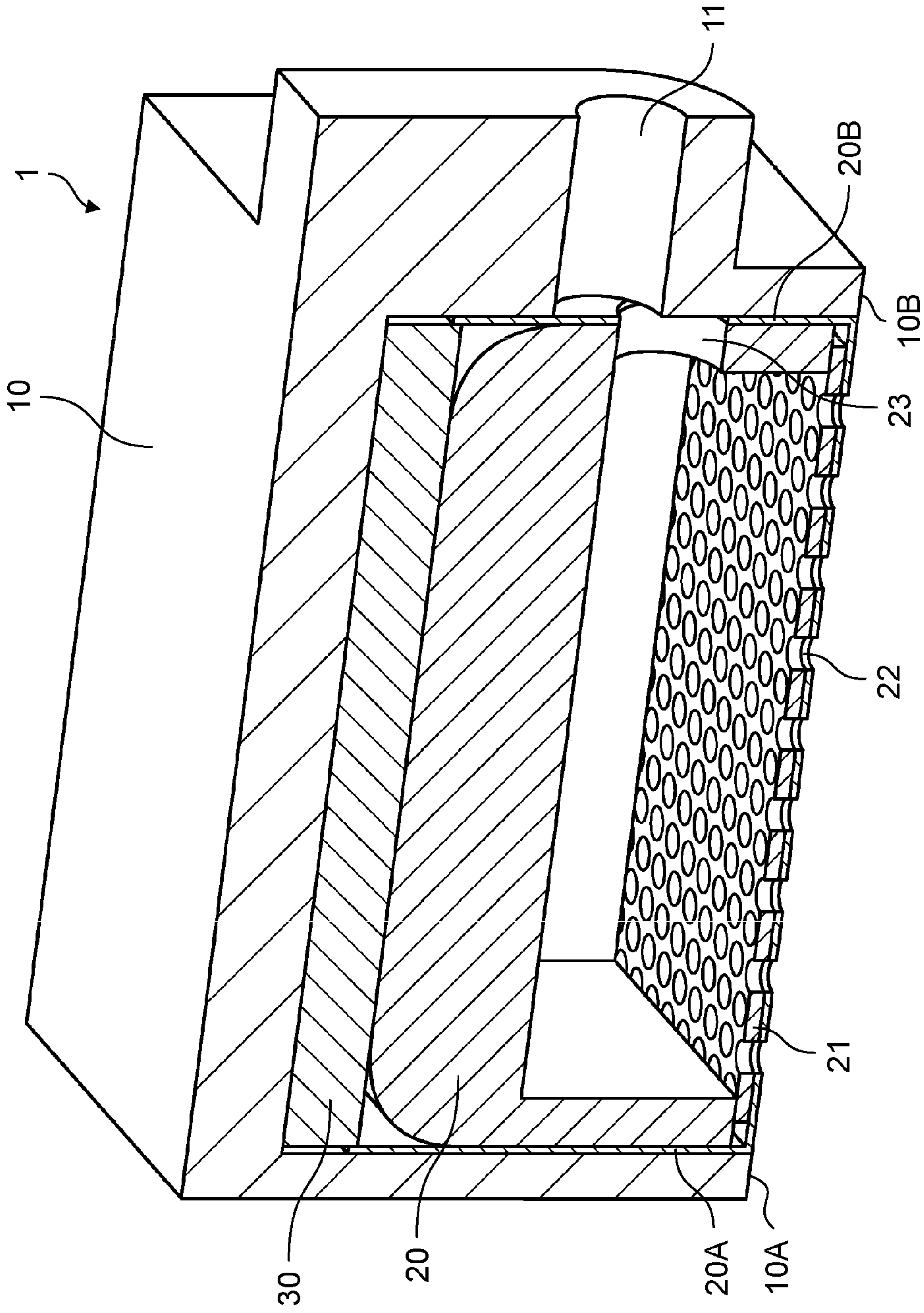
FIG. 6 is a perspective view illustrating a section of a sucking apparatus according to an exemplary embodiment of the present disclosure.

FIG. 6 is a perspective view illustrating a section of sucking apparatus 1 according to an exemplary embodiment of the present disclosure. FIG. 6 illustrates a case where interior chamber part 20 moves in a direction opposite to the first direction (upward direction in the drawing) with respect to exterior part 10. With reference to FIGS. 4 and 6, suction using sucking apparatus 1 will be described.

Exterior part 10 includes passage 11. Passage 11 is allowed to communicate with the pump through air tube 60 illustrated in FIG. 1, for example. Interior chamber part 20 includes opening 23. Opening 23 is allowed to communicate with passage 11. In a state where opening 23 communicates with passage 11 and passage 11 communicates with the pump, air in interior chamber part 20 is sucked out by operation of the pump.

Passage 11 is disposed in the side surface of exterior part 10, and opening 23 is disposed in the side surface of interior chamber part 20, in the present exemplary embodiment. Then, opening 23 and passage 11 communicate with each other when interior chamber part 20 moves by a predetermined distance in the direction opposite to the first direction with respect to exterior part 10. This configuration enables the air in the interior chamber part 20 to be sucked out when sucking apparatus 1 is pressed against thermally conductive sheet S in the first direction.

Placement places and configurations of passage 11 and opening 23 are not limited to the exemplary embodiment described above. For example, passage 11 and opening 23 may be provided in upper surfaces of exterior part 10 and interior chamber part 20, or in other regions. Opening 23 and passage 11 may always communicate with each other.

Figure 7:
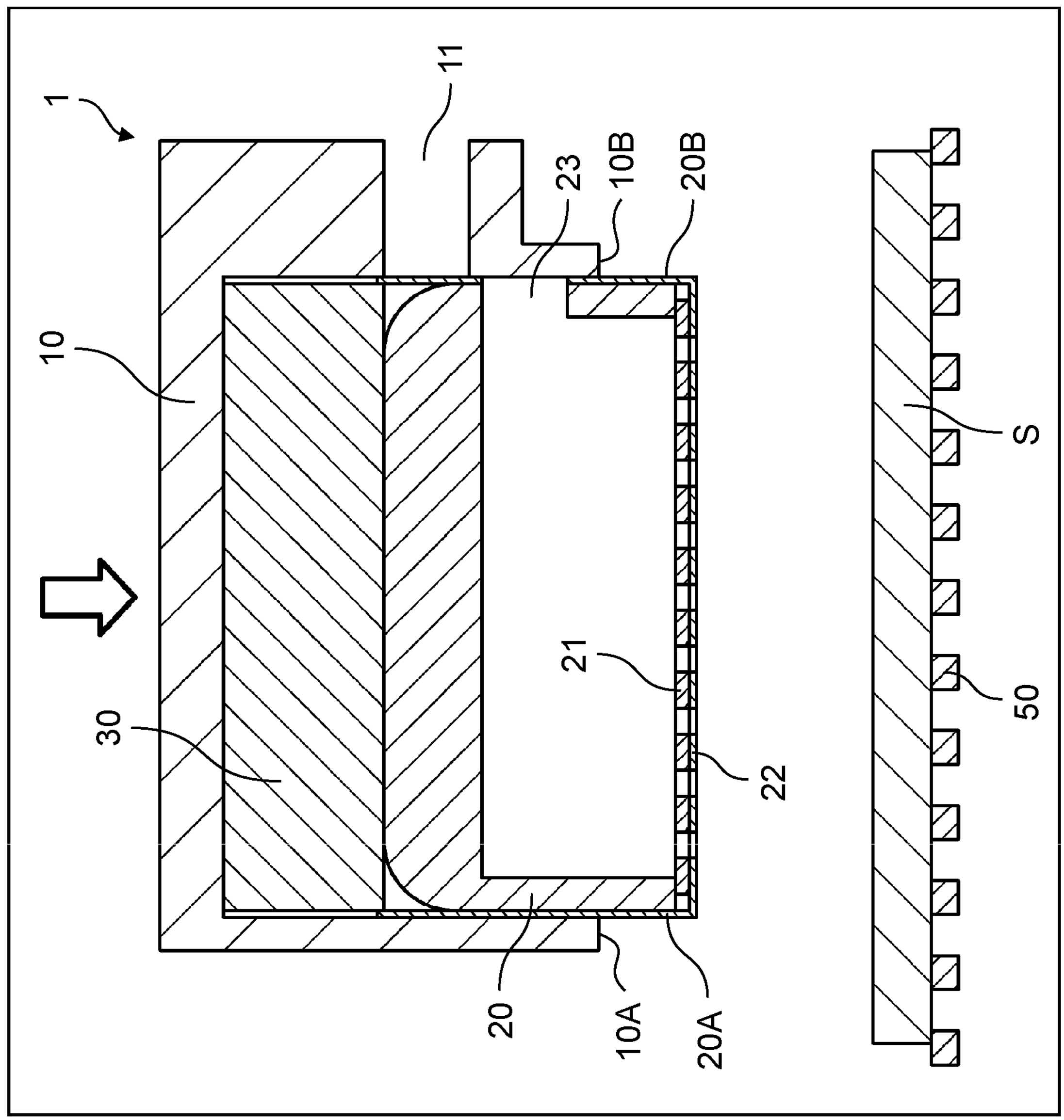
FIG. 7 is a conceptual diagram illustrating a state before a sucking apparatus sucks a thermally conductive sheet.

FIG. 7 is a conceptual diagram illustrating a state before sucking apparatus 1 sucks thermally conductive sheet S. Thermally conductive sheet S is disposed on mounting plate 50. Mounting plate 50 is provided with holes opened, and has a small ground contact area with thermally conductive sheet S. Thus, thermally conductive sheet S is not bonded to mounting plate 50.

The end effector (not illustrated) supports sucking apparatus 1 and moves sucking apparatus 1 to a position directly above thermally conductive sheet S. Then, sucking apparatus 1 is moved in a direction of an outlined arrow (first direction) in FIG. 7. At this point in time, interior chamber part 20 is moved by a maximum distance in the first direction with respect to exterior part 10. Then, elastic member 30 serving as a cushion, for example, expands in the first direction. In this state, opening 23 and passage 11 do not communicate with each other.

Figure 8:
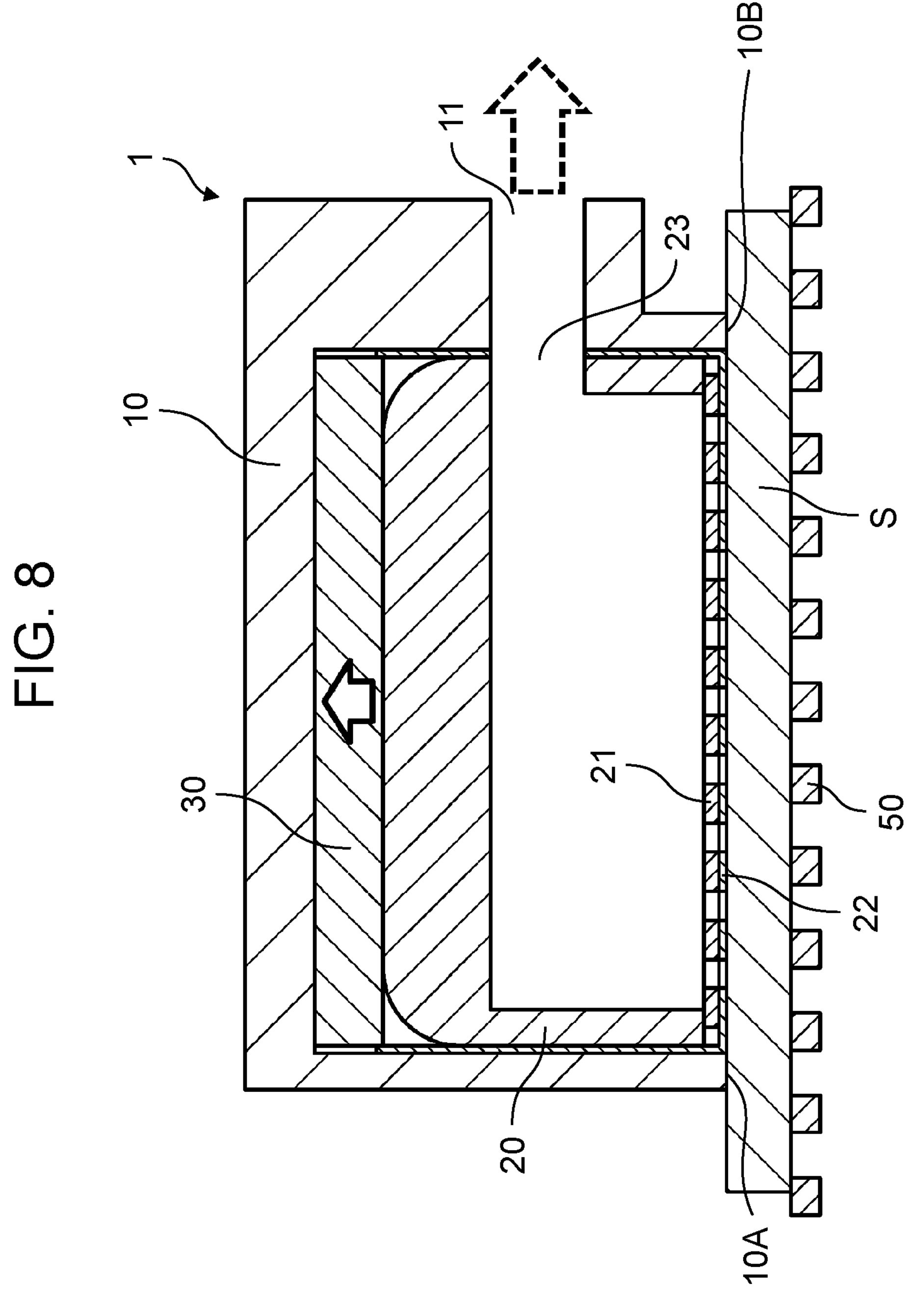
FIG. 8 is a conceptual diagram illustrating a state in which a sucking apparatus sucks a thermally conductive sheet.

FIG. 8 is a conceptual diagram illustrating a state in which sucking apparatus 1 sucks thermally conductive sheet S. The end effector (not illustrated) supports sucking apparatus 1 and presses sucking apparatus 1 against thermally conductive sheet S. This pressing force causes elastic member 30 to be deformed and contracted, and thus causing interior chamber part 20 to be moved in the direction opposite to the first direction with respect to exterior part 10. The movement of interior chamber part 20 allows opening 23 and passage 11 to communication with each other. In a state where opening 23 communicates with passage 11, the pump communicating with passage 11 starts suction and sucks out the air in interior chamber part 20 (broken-line arrow in FIG. 8). Thermally conductive sheet S in contact with release film 22 is sucked up by suction force generated in interior chamber part 20. The surface of release film 22 is slippery, so that thermally conductive sheet S is not bonded to release film 22 to such an extent that thermally conductive sheet S cannot be separated. Exterior part 10 surrounds interior chamber part 20, and edges 10A and 10B of exterior part 10 seal a space formed by exterior part 10 and thermally conductive sheet S, so that leakage of air at the time of suction is prevented. Exterior part 10 includes edges 10A, 10B with surfaces in contact with thermally conductive sheet S, the surfaces corresponding to the second surface of the second member.

Although thermally conductive sheet S is in contact with edges 10A, 10B of exterior part 10, areas below edges 10A, 10B are originally small. More specifically, the second surface has a smaller area than the first surface. Thus, thermally conductive sheet S is not bonded to edges 10A, 10B corresponding to the second surface to such an extent that thermally conductive sheet S cannot be separated. As a result, thermally conductive sheet S remains to be sucked by sucking apparatus 1 unless the suction force generated by operation of the pump disappears. When the end effector moves sucking apparatus 1 in this state, thermally conductive sheet S is also moved together with sucking apparatus 1. At this time, negative pressure is applied to the inside of exterior part 10 by suction, so that elastic member 30 is kept deformed and contracted.

For example, the second member is in contact with the sheet with a small area as in the above example, so that even the sheet having adhesiveness can be peeled off without applying an excessive force. Additionally, the sheet can be peeled off without applying an excessive force, so that the sucking apparatus can handle a fragile sheet such as thermally conductive sheet S, for example.

Figure 9:
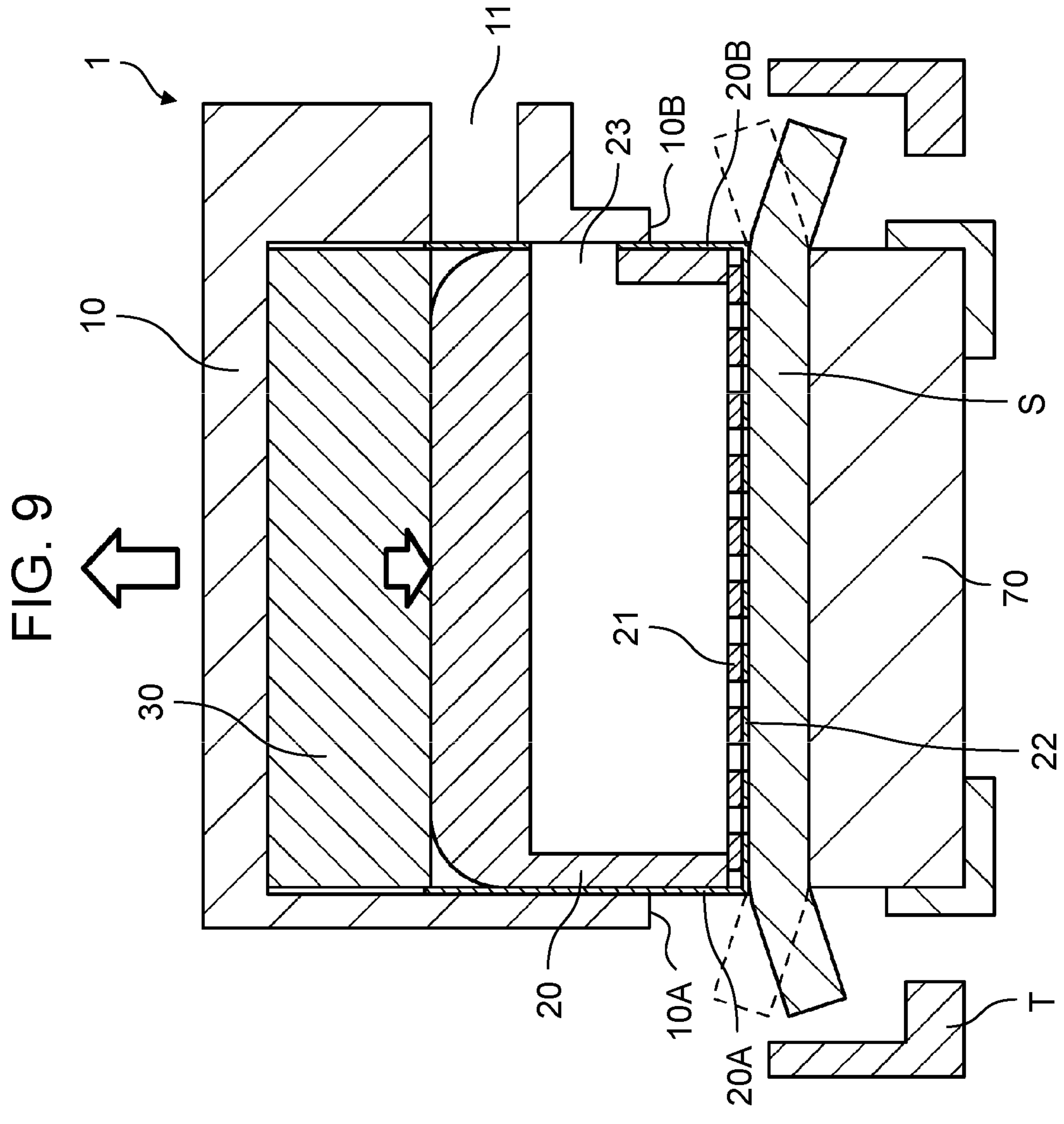
FIG. 9 is a conceptual diagram illustrating a state in which a sucking apparatus sticks a thermally conductive sheet to a heating element.

FIG. 9 is a conceptual diagram illustrating a state in which sucking apparatus 1 sticks thermally conductive sheet S to heating element 70. Heating element 70 may be an IC or the like provided in an electronic device, for example. Heating element 70 is supported by support T. The end effector (not illustrated) supports sucking apparatus 1 and moves sucking apparatus 1 to a position immediately above heating element 70. Then, suction by the pump is stopped. Thus, the negative pressure in exterior part 10 disappears, and then elastic member 30 is about to return to an original state, thereby pushing out interior chamber part 20 in the first direction (downward direction in the drawing).

Interior chamber part 20 is then moved in the first direction with respect to exterior part 10 to push out thermally conductive sheet S in the first direction. This pushing-out causes thermally conductive sheet S to be peeled off from edges 10A, 10B of exterior part 10. The areas below edges 10A, 10B are originally small, so that a large force is not applied when thermally conductive sheet S is peeled off from edges 10A, 10B. Thus, even thermally conductive sheet S having a brittle property is not broken.

Although thermally conductive sheet S has adhesiveness, release film 22 and thermally conductive sheet S are not bonded to each other. In contrast, thermally conductive sheet S pushed out is bonded to heating element 70 due to the adhesiveness of thermally conductive sheet S. After that, the end effector moves sucking apparatus 1 in the direction opposite to the first direction (upward direction in the drawing), and then a step of sticking thermally conductive sheet S is terminated.

FIG. 9 illustrates broken lines that indicate a shape of thermally conductive sheet S when interior chamber part 20 moving in the first direction starts to push out thermally conductive sheet S. Thermally conductive sheet S has end parts raised in the direction opposite to the first direction (upward direction in the drawing) due to a reaction of a central part of thermally conductive sheet S being pushed out in the first direction. At this time, the end parts of thermally conductive sheet S in contact with the side surfaces having protruded of interior chamber part 20 may be bonded to the side surfaces of interior chamber part 20. To avoid such a situation, release film 22 is further stuck to side surfaces 20A, 20B of interior chamber part 20 as illustrated in FIGS. 3 and 4 and the like. As a result, the end parts of thermally conductive sheet S are not bonded to the side surfaces of interior chamber part 20, and thus thermally conductive sheet S can be smoothly stuck to heating element 70. As described above, an aspect of the surface treatment is not limited to sticking release film 22. The first member includes a side surface around the first surface, the side surface being subjected to surface treatment. This surface treatment enables avoiding a disadvantage in that the end parts of the sheet having adhesiveness is bonded to the side surfaces of the first member.

Alternatively, interior chamber part 20 may include an end part (a part close to exterior part 10) with a surface facing outward (downward in FIG. 9) that is formed in a protruding shape. The end part formed in a protruding shape of interior chamber part 20 enables preventing the end part of thermally conductive sheet S from rising as indicated by the broken lines in FIG. 9.

Figure 10:
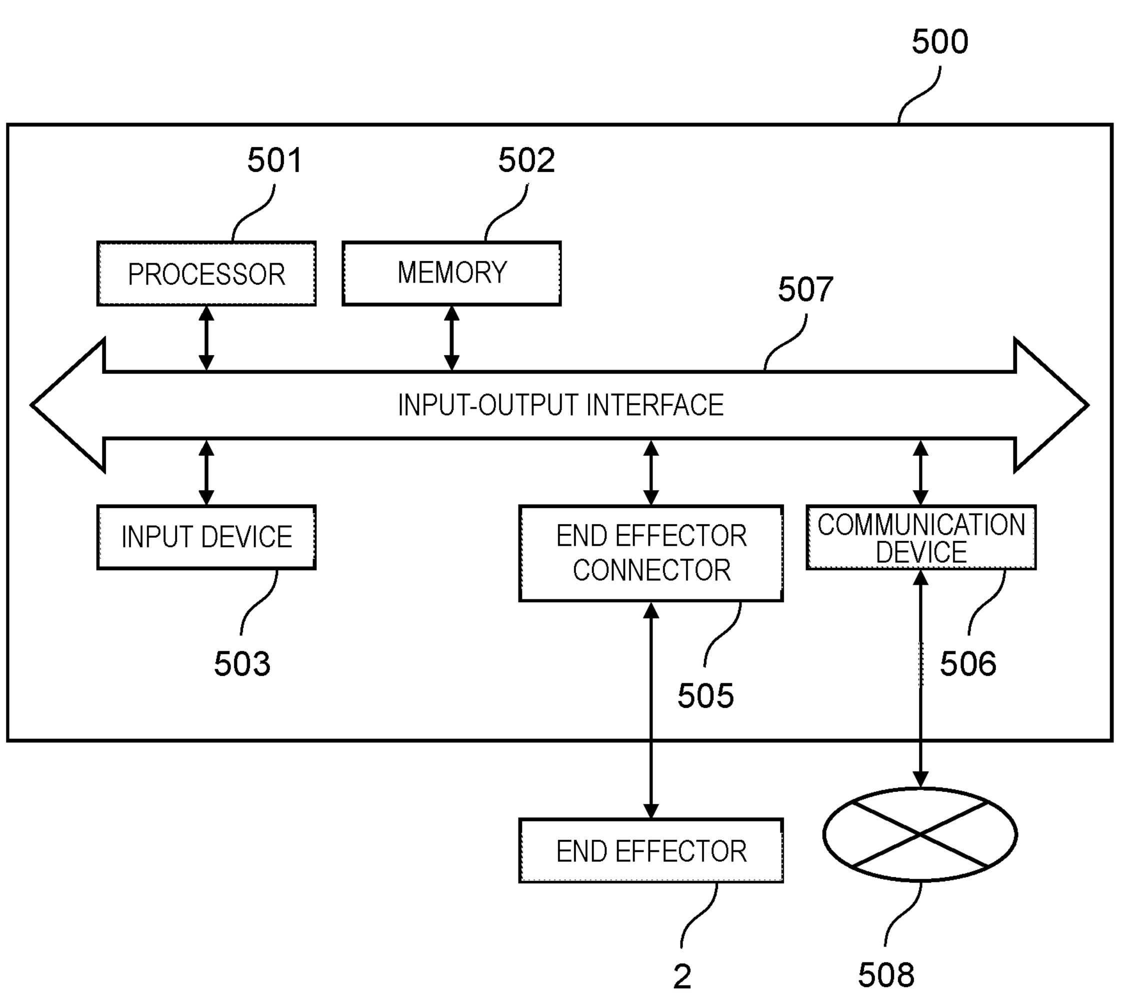
FIG. 10 is a block diagram illustrating an example of a hardware configuration of a control system used together with an end effector capable of supporting a sucking apparatus according to an exemplary embodiment of the present disclosure.

FIG. 10 is a block diagram illustrating an example of a hardware configuration of control system 500 used together with end effector 2 capable of supporting sucking apparatus 1 according to an exemplary embodiment of the present disclosure. Control system 500 controls operation of end effector 2 capable of supporting sucking apparatus 1 according to an exemplary embodiment of the present disclosure. Control system 500 may further control a robot arm (not illustrated). Control system 500 may be then provided inside the robot arm or may be provided outside the robot arm.

Control system 500 includes processor 501, memory 502, input device 503, end effector connector 505, communication device 506, and input-output interface 507. Memory 502, input device 503, end effector connector 505, communication device 506, and input-output interface 507 are each connected to processor 501 by an internal bus or the like to enable input and output of data or information.

Processor 501 functions as a controller of control system 500. For example, processor 501 performs control processing for comprehensively controlling operation of each part of control system 500, input-output processing of data or information with each part of control system 500, calculation processing of data, and storage processing of data or information. Processor 501 functions also as a controller that controls end effector 2 and the robot arm. Processor 501 may control operation of an actuator for end effector 2 or a motor for end effector 2, for example. Processor 501 may be a central processing unit (CPU), a micro processing unit (MPU), a digital signal processor (DSP), a field programmable gate array (FPGA), or the like. Processor 501 may control operation and stop of the pump described above.

Memory 502 stores various programs (an operating system (OS), application software, etc.) to be executed by processor 501, and various data. Memory 502 includes, for example, a hard disk drive (HDD), a flash memory, a read only memory (ROM), and/or a random access memory (RAM).

Input device 503 has a function as a human interface for a user and receives operation of the user. In other words, input device 503 is used for giving an input or an instruction for various processes performed by control system 500. Examples of input device 503 include a keyboard and a mouse. Alternatively, input device 503 is a programming pendant connected to the controller (not illustrated) of the robot arm.

End effector connector 505 is a device for connecting end effector 2 to control system 500. End effector connector 505 and end effector 2 are connected by a wire such as a connector and a cable. Alternatively, end effector connector 505 and end effector 2 may be wirelessly connected.

Communication device 506 is for communicating with the outside via network 508. This communication may be wired communication or wireless communication.

Input-output interface 507 has a function as an interface for inputting and outputting data or information from or to each device constituting control system 500.

The configuration of control system 500 illustrated in FIG. 10 is an example, and control system 500 may not include some of the components illustrated in FIG. 10 or may further include an additional component not illustrated in FIG. 10.

Appendix of Claim 1

As described above, sucking apparatus 1 according to an aspect of the present disclosure is for a sheet (such as thermally conductive sheet S) having adhesiveness, and includes a first member including a first surface that sucks the sheet, and a second member including a second surface that surrounds an outer periphery of the first surface and is in contact with the sheet. The first surface includes a plurality of holes opened, and the first surface is subjected to surface treatment to allow the sheet to be less likely to stick to the first surface than to the second surface. This configuration enables providing a sucking apparatus for a sheet having adhesiveness.

Appendix of Claim 2

The first member includes a side surface around the first surface, the side surface being subjected to surface treatment. This surface treatment enables avoiding a disadvantage in that end parts of the sheet having adhesiveness is bonded to side surfaces of the first member.

Appendix of Claim 3

Between an inner wall of the second member and an outer wall of the first member, elastic member 30 is disposed. Elastic member 30 has elasticity that allows the first member to be movable in the first direction with respect to the second member. This configuration allows elastic member 30 to push out the first member that sucks the sheet when suction is stopped, and thus enables the sheet to be correctly stuck to heating element 70.

Appendix of Claim 4

Elastic member 30 may be a cushion. Thus, the first member can be pushed out with a simple structure.

Appendix of Claim 5

The second member includes passage 11 allowed to communicate with a pump, and the first member includes opening 23 allowed to communicate with passage 11. This configuration enables air in the first member to be sucked by the pump provided outside.

Appendix of Claim 6

Passage 11 is disposed in a side surface of the second member and opening 23 is disposed in the side surface of the first member. Opening 23 and passage 11 communicate with each other when the first member moves by a predetermined distance in a direction opposite to the first direction with respect to the second member. This configuration enables air in the first member to be sucked by the pump provided outside when sucking apparatus 1 is pressed against the sheet.

Appendix of Claim 7

The surface treatment is performed by sticking release film 22 to the first surface of the first member. This surface treatment enables performing surface processing of preventing the first surface of the first member from being bonded to the sheet by a simple step of sticking release film 22.

Appendix of Claim 8

Release film 22 is further stuck to the side surface of the first member. This configuration enables preventing a disadvantage in that the end parts of the sheet are bonded to the side surfaces of the first member when the sheet is stuck.

Appendix of Claim 9

The first member includes the plurality of holes that is opened in a staggered placement. This configuration enables both the amount of air movement and surface strength of the first member to be maintained in a well-balanced manner.

The exemplary embodiments have been described above with reference to the accompanying drawings, but the present disclosure is not limited to the above examples. It is obvious that those skilled in the art can conceive various changes, modifications, substitutions, additions, deletions, and equivalents within the scope described in the claims, and it is understood that these also belong to the technical scope of the present disclosure. Additionally, the components in the exemplary embodiments described above may be arbitrarily combined without departing from the spirit of the present invention.

The sucking apparatus of the present disclosure is useful as a sucking apparatus for a sheet having adhesiveness.

What is claimed is:

1. A sucking apparatus for a sheet having adhesiveness, the sucking apparatus comprising:

a first member including a first surface that sucks the sheet; and a second member including a second surface that surrounds an outer periphery of the first surface and is in contact with the sheet, wherein the first surface includes a plurality of holes opened, and the first surface is subjected to surface treatment to allow the sheet to be less likely to stick to the first surface than to the second surface.

2. The sucking apparatus according to claim 1, wherein the first member includes a side surface around the first surface, the side surface being subjected to surface treatment.

3. The sucking apparatus according to claim 1, wherein between an inner wall of the second member and an outer wall of the first member, an elastic member is disposed, and the elastic member has elasticity that allows the first member to be movable in a first direction with respect to the second member.

4. The sucking apparatus according to claim 3, wherein the elastic member is a cushion.

5. The sucking apparatus according to claim 1, wherein the second member includes a passage allowed to communicate with a pump, and the first member includes an opening allowed to communicate with the passage.

6. The sucking apparatus according to claim 5, wherein the passage is disposed in a side surface of the second member, the opening is disposed in the side surface of the first member, and the opening and the passage communicate with each other when the first member moves by a predetermined distance in a direction opposite to the first direction with respect to the second member.

7. The sucking apparatus according to claim 1, wherein the surface treatment is performed by sticking a release film to the first surface of the first member.

8. The sucking apparatus according to claim 7, wherein the release film is further stuck to the side surface of the first member.

9. The sucking apparatus according to claim 1, wherein the first member includes the plurality of holes that is opened in a staggered placement.

* * * * *